US008188841B2

(12) United States Patent
Dowla et al.

(10) Patent No.: US 8,188,841 B2
(45) Date of Patent: May 29, 2012

(54) METHOD OF REMOTE POWERING AND DETECTING MULTIPLE UWB PASSIVE TAGS IN AN RFID SYSTEM

(75) Inventors: Farid U. Dowla, Castro Valley, CA (US); Faranak Nekoogar, San Ramon, CA (US); David M. Benzel, Livermore, CA (US); Gregory E. Dallum, Livermore, CA (US); Alex Spiridon, Palo Alto, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 1185 days.

(21) Appl. No.: 11/897,773

(22) Filed: Aug. 31, 2007

(65) Prior Publication Data
US 2008/0252422 A1 Oct. 16, 2008

Related U.S. Application Data

(60) Provisional application No. 60/842,567, filed on Sep. 5, 2006.

(51) Int. Cl.
*H04Q 5/22* (2006.01)
(52) U.S. Cl. ............... 340/10.34; 340/10.33; 340/10.1; 455/456.2; 455/456.1
(58) Field of Classification Search .............. 340/10.1, 340/10.33, 10.34; 324/314; 342/450; 455/456.1, 455/456.2, 133
See application file for complete search history.

(56) References Cited

U.S. PATENT DOCUMENTS

| | | | |
|---|---|---|---|
| 5,686,902 A * | 11/1997 | Reis et al. ................ 340/10.2 |
| 605,495 A | 4/2000 | Fontana | |
| 6,512,455 B2 | 1/2003 | Finn et al. | |
| 6,550,674 B1 | 4/2003 | Neumark | |
| 6,914,552 B1 * | 7/2005 | McEwan .................... 342/22 |
| 7,154,396 B2 * | 12/2006 | Reunamaki ............ 340/572.4 |
| 7,180,421 B2 | 2/2007 | Pahlaven et al. | |
| 7,257,504 B2 | 8/2007 | Bolander et al. | |
| 7,317,378 B2 | 1/2008 | Jarvis et al. | |
| 7,532,120 B2 * | 5/2009 | Estevez et al. ......... 340/572.1 |
| 2004/0025859 A1 | 2/2004 | Schulte | |
| 2004/0259604 A1 | 12/2004 | Mickle et al. | |
| 2006/0290508 A1 * | 12/2006 | Moutchkaev et al. ..... 340/572.1 |
| 2007/0046435 A1 * | 3/2007 | Fratti et al. ................. 340/10.2 |

OTHER PUBLICATIONS

"A Coded Radar Reflector for Remote Identification of Personnel and Vehicles," Frank R. Williamson, Lacey F. Moore, Ralph Brooks, Julie Anne Williamson, and Melvin C. McGee, Record of the 1993 IEEE National Radar Conference, Lynnfield, MA, USA, Apr. 20-22, 1993, ISBN 0-7803-0934-0, pp. 186-191.*
"Ultra-Wideband Impulse Radar" Wheeler, P.,Daniels, D.J., Spread Spectrum Techniques and Applications Proceedings, 1996., IEEE 4th International Symposium.*

* cited by examiner

*Primary Examiner* — Benjamin C Lee
*Assistant Examiner* — Peter Mehravari
(74) *Attorney, Agent, or Firm* — John P. Wooldridge; Henry Sartorio

(57) ABSTRACT

A new Radio Frequency Identification (RFID), tracking, powering apparatus/system and method using coded Ultra-wideband (UWB) signaling is introduced. The proposed hardware and techniques disclosed herein utilize a plurality of passive UWB transponders in a field of an RFID-radar system. The radar system itself enables multiple passive tags to be remotely powered (activated) at about the same time frame via predetermined frequency UWB pulsed formats. Once such tags are in an activated state, an UWB radar transmits specific "interrogating codes" to put predetermined tags in an awakened status. Such predetermined tags can then communicate by a unique "response code" so as to be detected by an UWB system using radar methods.

9 Claims, 5 Drawing Sheets

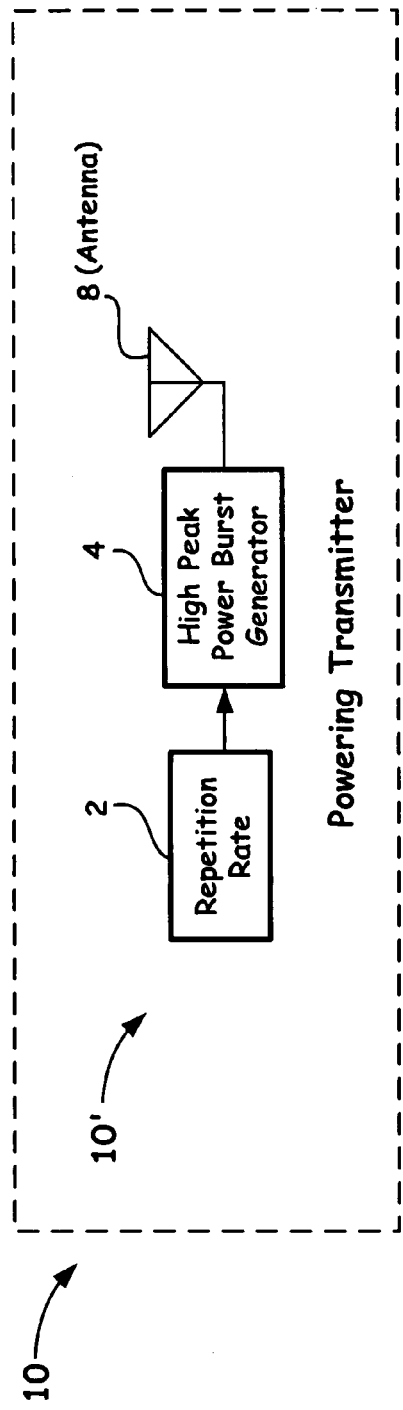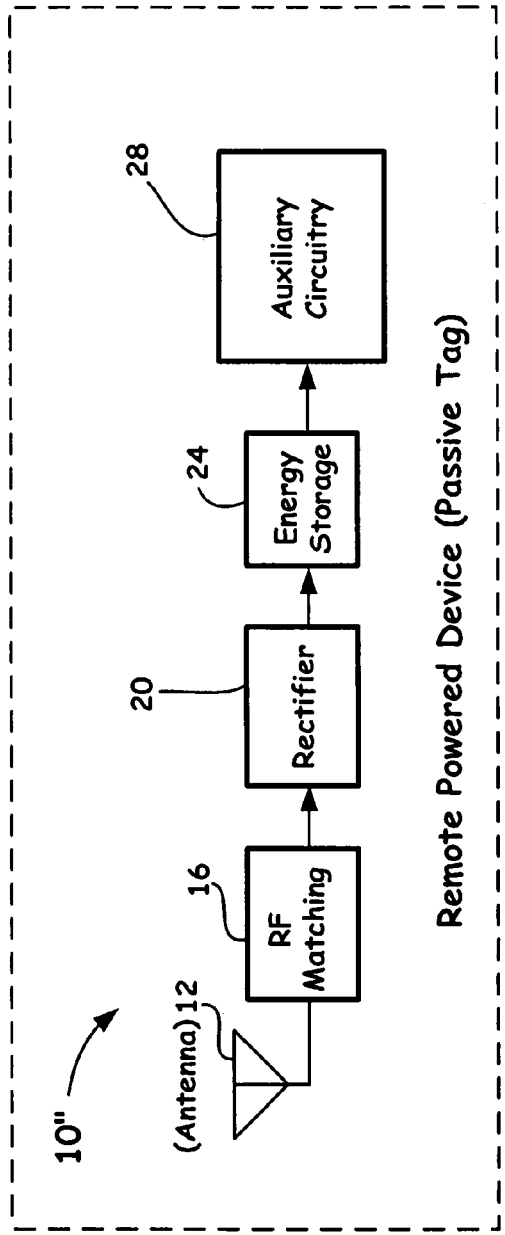

METHOD OF REMOTE POWERING AND DETECTING MULTIPLE UWB PASSIVE TAGS IN AN RFID SYSTEM

RELATED APPLICATION

This application claims the benefit of U.S. Provisional Application No. 60/842,567, filed Sep. 5, 2006, and entitled, "Method of Remote Powering," which is incorporated herein by this reference.

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to an automatic identification technology that uses radio signals to identify and track objects, and more particularly, to a long range Radio Frequency IDentification (RFID) tracking and powering method and apparatus/system employing Ultra-wideband signaling.

2. Description of Related Art

Radio Frequency IDentification (RFID) is an automatic identification technology that uses radio signals to identify and track objects. Although many types of short-range RFID systems are available for inventory management and tracking of high-value items, most fall short in critical areas: range of operation (commercially available passive RFID tags operate over very short ranges), power consumption (active tags require batteries), cost, size, and security.

Conventional RFID systems—like those used by automated toll systems—include a reader that is both a transmitter and a receiver, and target tags. The reader communicates with the tags using narrowband radio signals. The tags store a serial number and perhaps other data and are attached to an antenna that transmits identification information to the reader. Most commercially available tags require an energy source, such as batteries, which are expensive, have a limited lifetime, and must be replaced periodically. Current commercial tags that are passive are highly range limited. Further, the narrowband signals that carry the identification data cannot penetrate some materials, including walls, dirt, or metal; most have short ranges (less than 2 meters); and they cannot operate in cluttered environments, such as warehouse full of metal shelving. Other commercially available RFID systems that use narrowband frequencies are vulnerable to interception and detection, making them unsuitable for most military and high security applications.

Accordingly, a need exists for an ultra wideband RFID method and system that utilizes passive (i.e., non-battery-operated) Ultra-Wideband (UWB) powering configurations at relatively long ranges in detection friendly as well as harsh and cluttered environments. The present invention is directed to such a need.

SUMMARY OF THE INVENTION

The present invention is directed to an ultra-wideband (UWB) Radio Frequency Identification (RFID) method, that includes: remotely powering one or more tags using an ultra-wideband format so as to activate said one or more tags, transmitting one or more uniquely coded ultra-wideband interrogation signals so as to configure such tags to be on an awakened status to generate a respective response code within each of the alerted one or more tags; and receiving modulated ultra-wideband radar signals indicative of the response codes so that said one or more tags are detected.

Another aspect of the present invention is directed to an ultra-wideband (UWB) Radio Frequency Identification (RFID) system that enables multiple passive tags to be remotely powered via an UWB transceiver at about the same time frame via predetermined frequency UWB signals. Once such tags are in a responsive state (awakened), the UWB transceiver transmits specific "interrogating codes" to each tag. Individual tags respond by a unique "response code" that can be detected by an UWB system using radar methods.

A final aspect of the present invention is directed to an ultra-wideband (UWB) Radio Frequency Identification (RFID) system that also enables multiple passive tags to be remotely powered via an UWB power transmitter at about the same time frame via predetermined frequency UWB signals. Once such tags are in a responsive state (awakened), an UWB radar transmits specific "interrogating codes" to each tag. Individual tags respond by a unique "response code" that can be detected by an UWB system using radar methods.

Accordingly, the present system and method provides a desired UWB system/apparatus and method capable of passive (i.e., non-battery-operated) powering configured UWB tags at even relatively long ranges (up to about 20 meters) in a detection friendly as well as harsh and cluttered environments, such as, for example through walls, glass, buried in dirt, inside concrete buildings, in warehouses vaults, airplanes, ships, outside in landscapes full of rocks, environments with trees, and in environments having a large number of people. Moreover, Line-Of-Sight (LOS) is not needed for the UWB tags (i.e., the UTags) operation.

Beneficial applications include, but are not limited to, keeping track of surgical tools or other critical devices in high stress environments such as hospitals, tracking of livestock, tracking bird and other animal migrations for environmental monitoring, explosive detection, monitoring individuals, and tracking of high-valued commercial items or items stored in metallic environments, such as containers in cargo ships.

In addition, because the UWB tags utilized herein are battery-less (i.e., passive), they have substantially unlimited or unrestricted lifetimes without human intervention, and they are lower in cost to manufacture and maintain than active RFID tags. These robust, energy-efficient passive tags can be remotely powered by UWB novel radio coded signals of the present invention, which are much more difficult to detect, intercept, and jam than conventional narrowband frequencies.

BRIEF DESCRIPTION OF THE DRAWINGS

The accompanying drawings, which are incorporated into and form a part of the disclosure, illustrate an embodiment of the invention and, together with the description, serve to explain the principles of the invention.

FIG. 1a shows a general block diagram of an Ultra-Wideband (UWB) powering transmitter of the present invention.

FIG. 1b shows a general block diagram of a passive remote UWB Tag (UTag) of the present invention.

DETAILED DESCRIPTION OF THE INVENTION

Figure 2A:
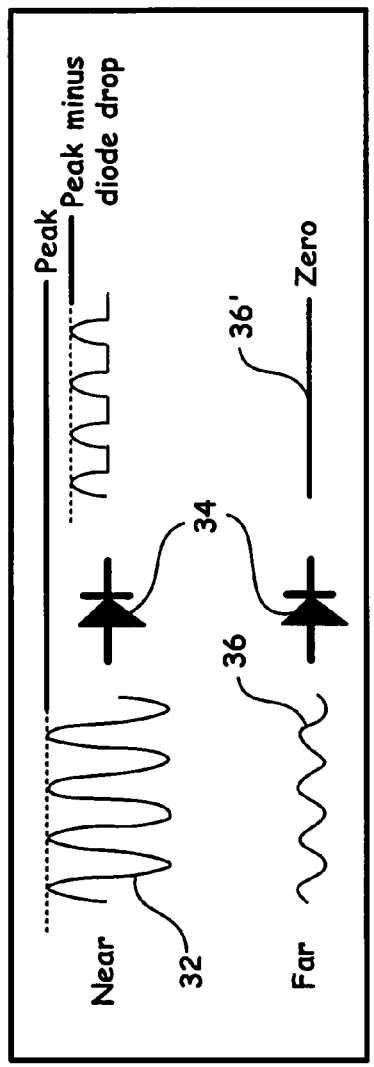
FIG. 2a illustrates power transfer efficiency of remote UTags using continuous wave (CW) signaling.

Referring now to the drawings, specific embodiments of the invention are shown. The detailed description of the specific embodiments, together with the general description of the invention, serves to explain the principles of the invention. All publications, patent applications, patents, and other references mentioned herein are incorporated by reference in their entirety. In case of conflict, the present specification, including definitions, will control.

Unless otherwise indicated, all numbers expressing quantities of ingredients, constituents, reaction conditions and so forth used in the specification and claims are to be understood as being modified in all instances by the term "about". Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical value, however, inherently contain certain errors necessarily resulting from the standard deviation found in their respective testing measurements.

General Description

Ultra-wideband (UWB) communication systems in general, employ very narrow (pico-second to nano-second) radio frequency (RF) pulses to transmit and receive information. The short duration of such wideband pulses provides very wide bandwidth (in the range of GHz) with a low power spectral density (PSD). The low PSD enables UWB signals to share the RF spectrum with currently available radio services with minimal or no interference problems. Therefore, no expensive licensing of the spectrum is required by use of such UWB systems.

To be more specific, because of the low power spectral density, UWB pulses reside below the noise floor of a typical narrowband receiver, therefore, they become undetectable from background noise in most cases and only the intended receiver is able to detect them. Hence, the UWB tags, as described herein, are not vulnerable to detection, interception, and jamming. Furthermore, due to their large bandwidth and frequency diversity, the utilized UWB pulses are less sensitive to multi-path effects than when using continuous wave (CW) signals and such UWB pulses can provide excellent spatial resolutions. The fine spatial resolution of often down to less than about a foot, more often down to about a cm, enables the radio frequency identification (RFID) applications of the present invention to be utilized in heavy metallic environments, such as highly metal and constricted corridors found in most inventory configured enclosures. In addition, the lower frequencies covered by the inherent large UWB bandwidth offers good penetration properties, which provides through the wall communications and overcomes common signal blockage problems. Moreover, the UWB configurations described herein have fewer components and can be manufactured in smaller form factors compared to typical narrowband communication systems.

As understood by those of ordinary skill in the art, conventional methods for remote powering use continuous wave (CW) radio frequency bursts or a magnetic field. These charging methods limit the range of commercially available tags. To lengthen their range, conventional tags must have an energy source, such as a battery; but batteries have a limited lifetime, and are expensive and large in size.

Conversely, the present invention is directed to a "two-way" ultra-wideband (RFID) system and method that results in an increased energy efficiency and a greater communications range of up to about 20 meters. Unlike high-power narrowband tags, the present system and method utilizes a short-duration, high-peak amplitude UWB (e.g., of up to about 1 KV) pulsing transmitter to remotely power "activate" the tags. The receiver uses an efficient, energy-scavenging, UWB-matched circuit to receive the sub-nanosecond UWB pulses to the tags. The directed pulses beneficially reflect off nearby objects and are detected by the passive UWB tags. Just a few microwatts of remote power is adequate to power up, i.e, activate, the tags, as disclosed herein, because low duty cycle UWB pulses contain much higher peak power than CW signals. The large instantaneous power in UWB pulses overcomes the diode drop associated with the rectifying diode, resulting in increased efficiency of energy extraction and, therefore, powering out to greater distances. Thereafter, an interrogator unit, as described hereinafter, detects energy rebounded in a radar implementation from the one or more remotely powered-up tags. In particular, when a predetermined tag's power capacitor circuit charges up remotely ("remotely activated") and upon receiving an interrogating code from an interrogator so as to awaken the predetermined tag, a unique response code based on a respective UTag's configured logic circuit is initiated to drive the tag antenna into a sequence of switching transitions (a series of OPEN/CLOSE states) in response to the interrogating code. In other words, once the tag is powered up, it transmits its unique tag address or code by way of reflecting incoming UWB radar pulses as determined from the en-coded information induced on the tag antenna.

Accordingly, the present invention is directed to a long-range, Radio Frequency IDentification (RFID) signaling method and apparatus/system that capitalizes on UWB wireless technology to power up remote devices to enable data to be transmitted and received in short durational pulses (e.g., durations from about 100-picoseconds up to about 5 nanoseconds) across a wide range of the electromagnetic spectrum. In particular, the use of UWB and the configurations and methods herein enable remote powering of configured radio frequency (RF) tags at up to about 20 meters and enable the interrogation of such devices for inventory and tracking purposes.

Specific Description

As briefly discussed above in the general description, such novel UWB configurations of the present invention provides passive RF tags, deemed UTags (Note: UWB tags and "UTags" are interchangeable terms used herein) and a reader (e.g., an interrogator) that employs coded radar pulsed formats to identify, inventory, as well as track a variety of items, such as, but not limited to, computer hard drives, computer disks containing product specifications, prototype drawings, or personnel records. It is to be appreciated that by using such coded pulsed UWB formats and configurations described herein, the present invention can simultaneously interrogate (i.e., awaken) an unlimited number of configured tags at long ranges (up to about 20 meters) even if such tags are positioned in unfavorable cluttered or metallic environments, (e.g., in warehouses, retail stores, corporate offices, and/or military installations).

Turning now to the drawings, FIG. 1a and FIG. 1b in combination respectively show a basic schematic representation of an RFID system, designated as reference numeral 10, of the present invention. In particular FIG. 1a generally shows a powering transmitter, generally designated by reference numeral 10' that minimally includes a repetition rate generator 2, a high peak power UWB burst generator 4, and a transmitter antenna 8.

FIG. 1b shows a remote powered UTag device (i.e., a passive tag), generally designated by reference numeral 10" that includes a receiving antenna 12 configured to receive powering UWB pulses from powering transmitter 10' and additionally configured to direct received radar pulses from a predetermined UWB radar interrogator (not shown). In addition, UTag 10" also minimally includes RF matching circuitry 16, a rectifier 20, such as a single configured diode, an energy storage means 24, such as, for example, a capacitive element, and a configured auxiliary circuitry 28 that is powered up by the techniques and circuitry of the present invention, e.g., RF matching circuitry 16, rectifier 20, and energy storage means 24, but has no power source other than what power is extracted from one or more received UWB pulses.

Power transmitter 10' thus provides one or more high amplitude of up to about 1 KV, low duty cycle UWB pulses each having a pulse-width from about 100 ps up to about 5 ns, with low average power of down to about 5 mw, to be directed to remote UTags, such as UTag device 10", for the purpose of supplying power to such devices because of their respective passive configurations.

Accordingly, in the method of operation, a powering transmitter 10' is arranged to first send high amplitude, low duty cycle UWB pulses, as described above, to provide the necessary energy to activate one or more remote devices, e.g., passive UTag 10". Each respective passive tag, such as UTag 10", scavenges energy from the transmitted UWB RF pulses and the UTag switches into a response mode as then arranged from auxiliary circuitry 28. Finally, coded-UWB radar, as described below, then interrogates the tag to awaken predetermined tags, such as UTag 10" so as to obtain the tag's unique serial identification code.

Battery-Less Remote Charging

As stated above, the RFID system and method, as disclosed herein, provides increased energy efficiency and a greater communications range of up to about 20 meters. The present invention also beneficially utilizes a short-duration, high-peak amplitude UWB pulsing transmitter to remotely power the tags using one or more high amplitude UWB pulses of up to about 1 KV, having a low duty cycle, wherein each pulse is configured with a pulse-width from about 100 ps up to about 5 ns. Just a few microwatts of remote power of up to about 5 mW is adequate to power up the tags (i.e., activate) because such low duty cycle UWB pulses contain much higher peak power than CW signals. The large instantaneous power in UWB pulses overcomes the diode drop associated with the rectifying diode (i.e., rectifier 20 as shown in FIG. 1b), resulting in increased efficiency of energy extraction and, therefore, powering out to greater distances.

Figure 2B:
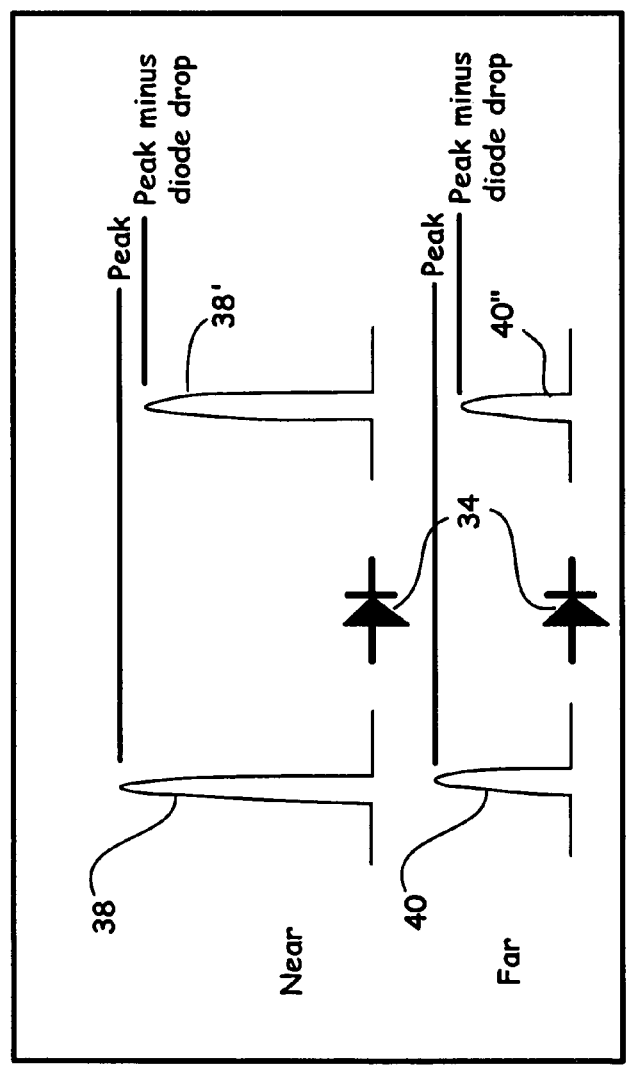
FIG. 2b illustrates power transfer efficiency of remote Tags using UWB signaling of the present invention.

FIG. 2a and FIG. 2b depict a comparison of power transfer efficiency between Continuous Wave (CW) powering signals, as shown in FIG. 2a, and Ultra-Wideband (UWB) powering signals, as shown in FIG. 2b. In particular, the top representation FIG. 2a shows that at near distances, i.e., up to about 3 feet, CW powering via the positive cycles of a CW transmitted signal 32 of still sufficient amplitude is somewhat enabling because the peak power minus the power drop across a rectifying diode 34 may still power up remote passive devices of the present invention within the allotted distances. However at far distances, e.g., at distances of 10 to 20 meters, an attenuated CW powering signal 36 (i.e., far distances diminish the signal strength) can result in a total power drop 36' across rectifying diode 34 so that such a transmitted CW signal 36 is incapable of powering any passive Tag device as disclosed herein.

Conversely, FIG. 2b illustrates that using by UWB pulsed signaling formats (near 38 and far 40) of the present invention, there is still sufficient enough power even after rectification (38' or far 40") via a power diode 34, at either near or far configurations of up to about 20 meters to enable such near or remote devices to be in a powered up mode (i.e., activated mode).

It is to be appreciated that UWB RF tags (i.e., UTAgs) as disclosed herein, need only about a couple of microwatts of power from a transmitter/receiver to active its digital radar reflecting behavior. Thus the power available in the UWB tags of the present invention is not the limiting factor in meeting long-range tag interrogation capabilities.

Figure 3A:
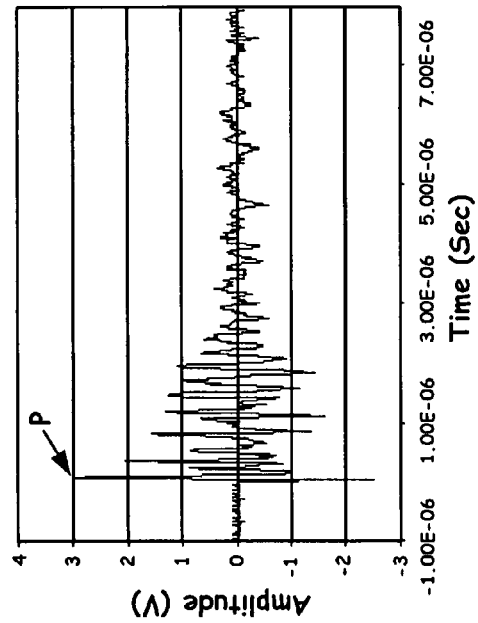
FIG. 3a shows an example transmitted UWB pulse designed to power up the remote passive devices of the present invention.

FIG. 3a shows an example transmitted UWB pulse designed to power up the remote passive devices disclosed herein so as to provide sufficient instantaneous power upon rectification by circuitry, such as, for example, the example rectifying diode 34 as shown in FIG. 2b. In particular, for the UWB transmitted pulse as shown in FIG. 3a, the high peak power at approximately 1 KV lasts for only up to about 120 ps, resulting in very low average power.

Figure 3B:
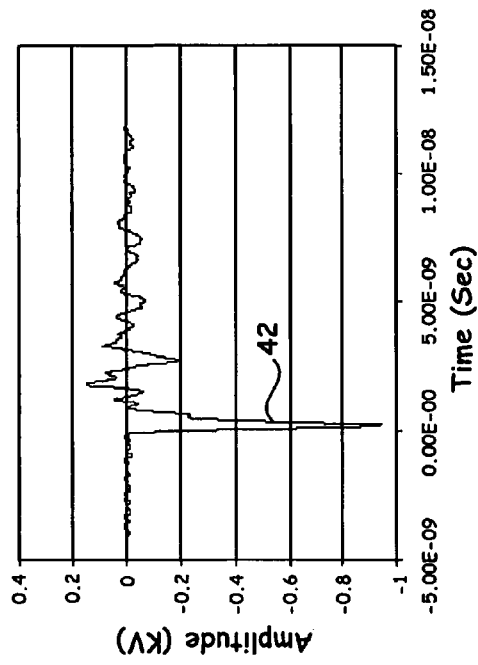
FIG. 3b shows an example plot of a received signal at 5 meters distance having a peak amplitude of 3 Volts.
Figure 3C:
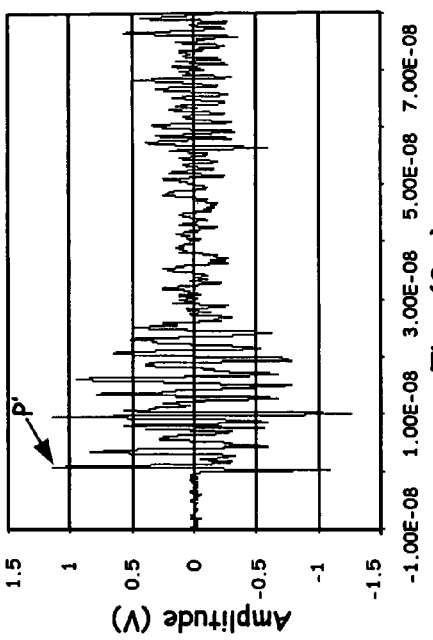
FIG. 3c shows an example plot of a received signal at 10 meters distance having a peak amplitude of 1.2 Volts.

FIG. 3b represents an example received signal at 5 meters having a peak amplitude of 3 Volts (peak denoted by the letter P) using circuitry and methods of the present invention while FIG. 3c represents an example received signal at 10 meters having a peak amplitude of 1.2 Volts (peak denoted by the letter P') also using circuitry and methods of the present invention both of which has considerable remaining energy to power up a remote electronic device at long distances.

Figure 3D:
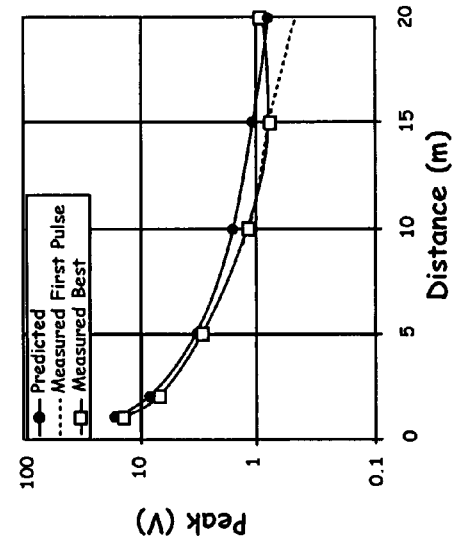
FIG. 3d shows a graph of measured and predicted RF voltages versus range for the embodiments of the present invention.

FIG. 3d represents a graph of measured and predicted RF voltages versus range for the embodiments of the present invention. The dashed line represents the first received pulse versus range, the line with squares represents the measured best received pulse (highest amplitude after multi-path effects) versus range, and the line with darkened circles shows the predicted voltage versus range.

Tag Interrogation

Figure 4:
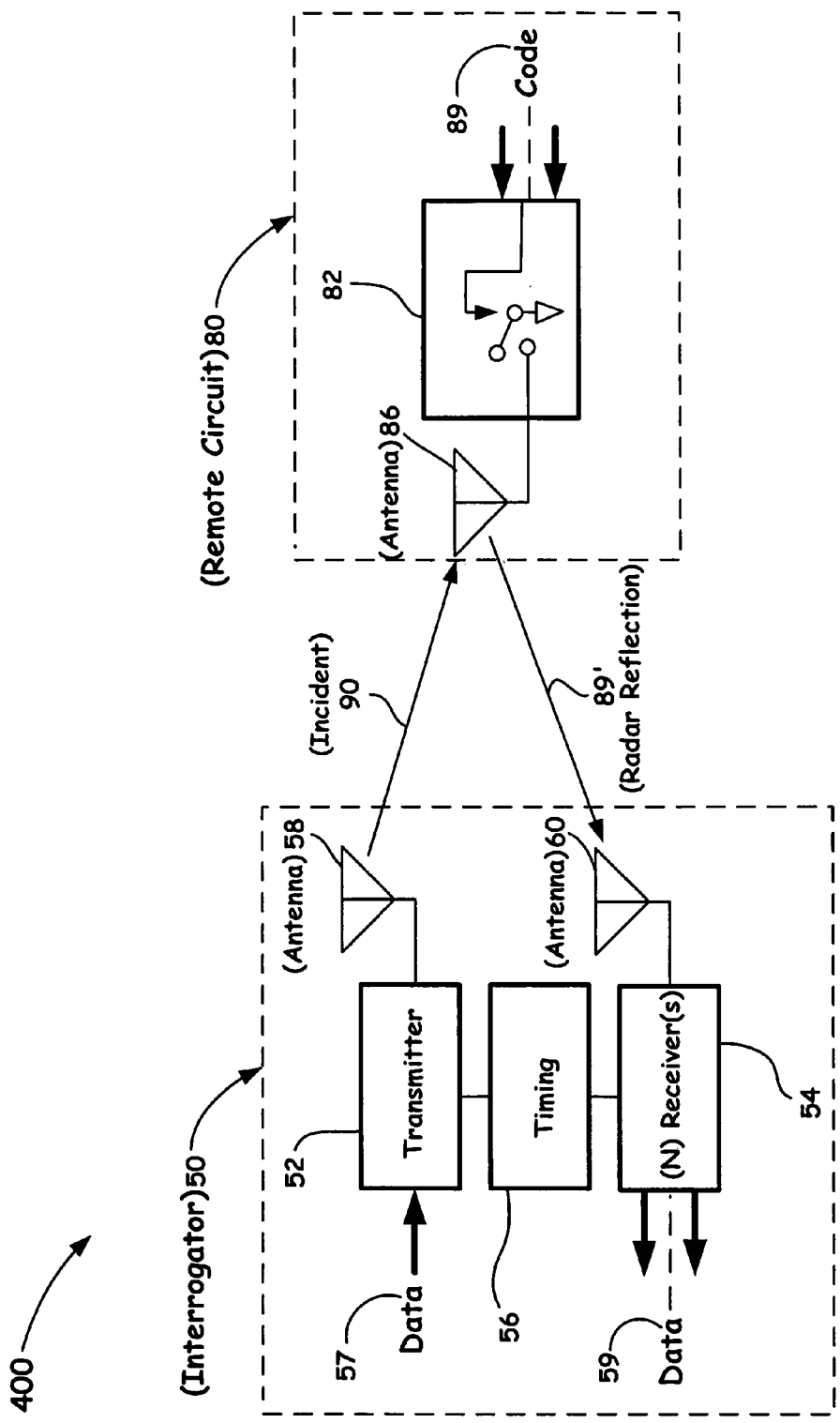
FIG. 4 shows such an exemplary UWB radar system embodiment of the present invention.

Another beneficial arrangement of the RFID system, as disclosed herein, is the use of UWB digital radar to interrogate a UTag of the present invention, i.e., to awaken a Utag so as to detect tag information. FIG. 4 shows such an exemplary UWB radar system embodiment of the present invention, generally designated by the reference numeral 400, having an interrogator UWB radar unit 50 (shown within a dashed box) and one or more remote UTag devices 80 of the present invention (one shown for simplicity as shown enclosed within the smaller dashed box).

The interrogator radar unit 50 generally includes an UWB transmitter 52, one or more receivers 54, a timing circuitry 56 to synchronize outgoing data 57 (denoted with a directional single arrow) as directed by transmitter 52 and detected radar-reflected coded data 59 (as denoted by the double directional arrows as shown being output by one or more receivers 52), a transmitting antenna 58, and a receiving antenna 60 that detects energy rebounded in a radar implementation from one or more remote tags, such as UTag 80. When a tag's (e.g., UTag 80) power capacitor circuit (not shown) charges up remotely ("activated"), its configured logic circuit 82 (shown generally as a switch) drives a configured tag antenna 86 into a unique sequence of switching transitions (a series of OPEN/ CLOSE states), generated by an embedded unique tag address 89 (also denoted by double directional arrows).

In particular, once a tag, such as UTAg 80 is powered up using UWB pulsed formats as described above, a UTAg 80 can transmit its unique tag address 89' by way of its antenna 86 operating as a radar-like reflector of received incident UWB pulsed codes 90 upon being put in an awakened status. The tag, such as UTag 80, thus behaves as a "Digital Radar reflector," with the reflecting pattern defined by the switching timing code, i.e., unique tag address 89, as configured within each logic circuit 82.

The interrogating codes (i.e., incident UWB pulsed information 90 to awaken predetermined tags) can be orthogonal codes, such as, but not limited to code division multiple access (CDMA) technology, Hermite function based orthogonal transmitted coded pulses and wavelet coded waveforms, or any of the orthogonal coding methods and/or transmitted reference (TR) modulation techniques disclosed and described in U.S. Pat. No. 7,194,019 B2 titled "Multi-pulse multi-delay (MPMD) multiple access modulation for UWB" by Dowla et al., assigned to the assignee of the present invention, the disclosure of which is herein incorporated by reference in its entirety. For example, the transmitted and received pulses of the present invention can include chirp pulses (i.e., a frequency modulated signal) with different start and end frequencies with each user having its own unique pulse shape. Chirp pulses that do not overlap in frequency band and are theoretically uncorrelated with each other (i.e., are orthogonal) can thereby be separated using techniques, such as TR modulation and autocorrelation techniques, as also disclosed in incorporated by reference U.S. Pat. No. 7,194,019 B2.

The receivers 54 of the present invention can be configured to demodulate the reflected pulses from UTAg 80 for multi-tag detection purposes, as further discussed below, if different frequencies, i.e., codes, are used to detect each tag and are more often coupled to processing means, such as, for example, computers for correlation, range determination, and for distinguishing said modulated interrogation ultra-wide-band signals from said activated one or more tags. Such receivers 54 can be configured with architectures known and understood by those skilled in the art, such as, but not limited to, high sensitivity, high gain, and high selectivity devices, wherein the high sensitivity is achieved through a high level of signal integration and high detection efficiency. Additional similar architectures for use in the present invention as receivers 54, as shown in FIG. 4, are disclosed in Co-pending, U.S. application Ser. No. 10/815,450 titled "UWB Communication and Receiver Feedback Loop" by Spiridon et al., assigned to the assignee of the present invention, the disclosure of which is herein incorporated by reference in its entirety. Such architectures described in U.S. application Ser. No. 10/815,450 combines a feedback loop method and system, orthogonal pulse shape coding (as briefly discussed above and as disclosed in detail in U.S. Pat. No. US7,194,019 B2), to conventional TR receivers to suppress narrow band interferers (NBI) and additive white Gaussian noise (AWGN), improve bit error rate (BER) performance, reduce MAI, and increase channel capacity.

Figure 5:
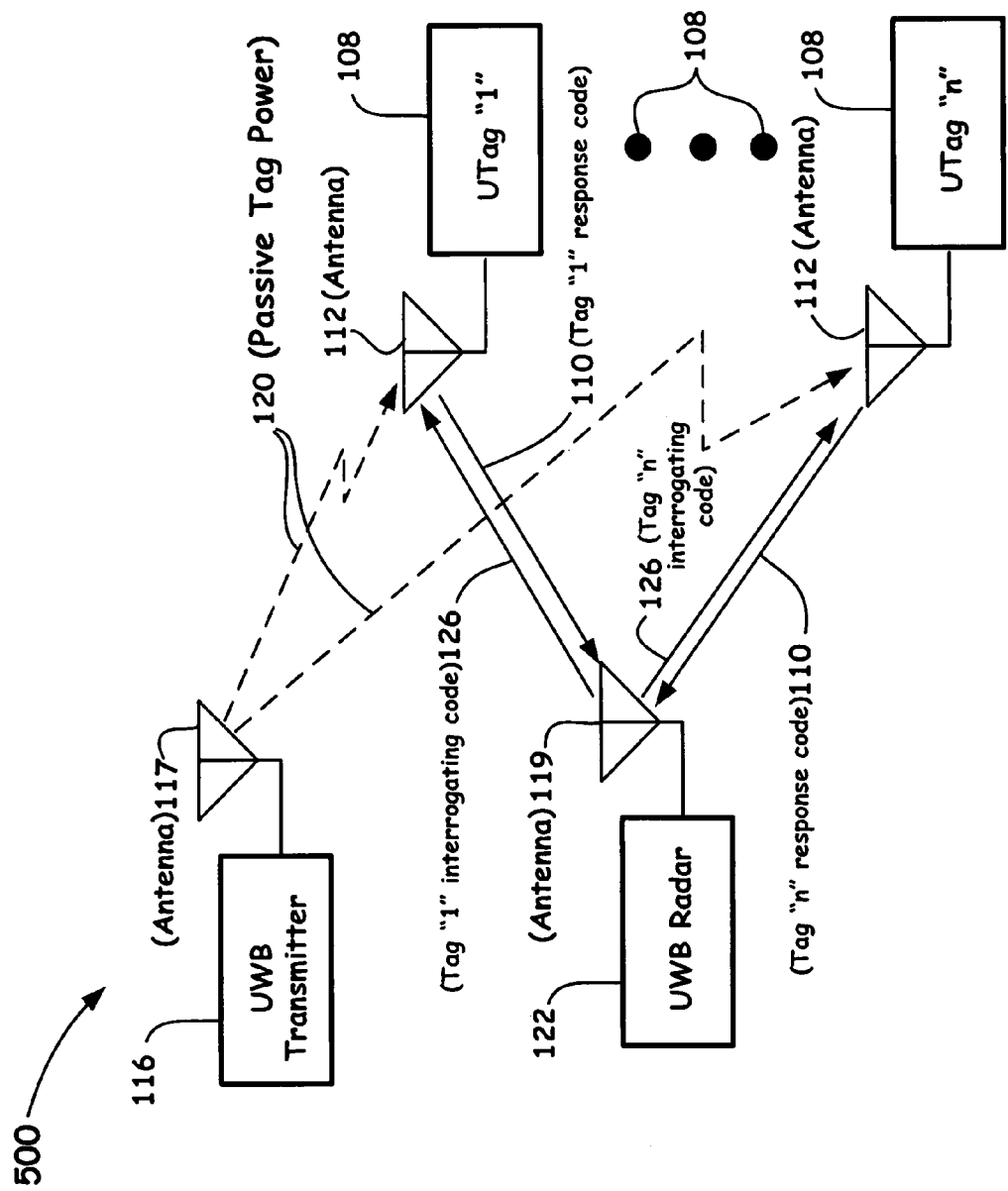
FIG. 5 illustrates a multi-tag application of the present invention.

FIG. 5 shows a particular example arrangement of the UWB radar system of FIG. 4, now generally designated by the reference numeral 500, to further illustrate the multi-tag methods and applications of the present invention. While not expressly detailed in FIG. 5, a plurality of UTags "1" through "n" 108 of the present invention are designed with a serial number generator (not shown) inside each UTag 108 in order to produce a specific "tag response code (i.e., address)" 110. Each respective UTag antenna 112 switches to a reflective (i.e., open) and/or non-reflective state (i.e., closed) based on the specific serial number. Once the UTags "1" through "n" 108 are all powered up via an UWB transmitter 116 directing Tag Power 120 via a respective transmitter antenna 117, as discussed previously, an UWB radar 122, e.g., interrogator 50, as shown in FIG. 4, synchronously sends one or more specific "interrogating codes" 126 to each UTag 108 via it's radar antenna 119 to wake up predetermined UTags. Individual awakened UTag(s) 108 can thus respond by a respective unique "response code(s)" 110 that is/are detected by the UWB radar 122 using radar as the detection mechanism. The unique interrogating code 126 provided by UWB radar 122, thus triggers an appropriate tag to respond and generate its unique response code 110 that is accomplished by switching its antenna tag 112.

Accordingly, individual tags listen for their specific interrogating code which can be the same or different code that is generated by a UTag's respective serial number generator and they can only respond after being called (i.e., awakened). Using such a novel method, as disclosed herein, multiple tags can be read without any interference from tags communicating with an interrogator, such as the interrogator as shown in FIG. 4. In addition, no high power synchronization technique is required to separate each tag's information from another one. A beneficial application for such a multi-tag arrangement includes integrating the UTags of present invention with inventory and tracking systems. For example, the UTags of the present invention can be attached to a plurality of equipment in a warehouse. When desired, low frequency UWB signals from a transmitter can then power all the UTags simultaneously. Once the UTags are all powered, the UWB radar, as shown in FIG. 5, can send specific "interrogating codes" to the tags so as to put them on an awakened status. The unique interrogating code triggers the appropriate UTag to respond with its unique "response code," in a radar implementation method.

Geolocation of UTags

It is to be appreciated that the UTags and accompanying hardware discussed herein can perform in harsh, cluttered environments and in environments where a Global Positioning (System GPS) might fail. However, the methods and devices of the present also has the ability to geo-locate (not just detect) a tag in 3-D (x-, y- and z). In particular, the present invention can construct signals by producing multiple measurements in time and space so as to accurately find powered UTags to within less than a foot, even in harsh environments in spite of possible multi-path propagation distortion. Furthermore, our ranging and positioning techniques directly address many of the known technical challenges encountered in UWB localization regarding synchronization and sampling. In the methods of the present invention, noisy, corrupted signals are recovered by repeating range measurements across a channel, and distance measurements are combined from many locations surrounding the target to minimize the range biases associated to indirect flight paths and through-wall propagation delays. Hence, UTag range measurements from UWB transceivers, as disclosed herein, can be used effectively in several applications including high-accuracy geolocation in harsh RF environments. In many sensor network applications, such as environmental monitoring of water in the soil or chemicals in the air, it is important to know the position of the network nodes. Range estimation from time-of-flight data for a pair of communicating nodes is particularly attractive when using short-duration or high-frequency pulses such as UWB systems of the present invention.

It should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. An ultra-wideband (UWB) Radio Frequency Identification (RFID) system, comprising:
   one or more tags configured in a passive state;
   an ultra-wideband high peak power burst generator configured to activate said one or more tags using ultra-wideband high peak power pulses;
   an ultra-wideband transmitter adapted to interrogate said activated one or more tags using uniquely coded tag specific ultra-wideband pulsed formats so as to awaken predetermined one or more tags and initiate a unique response code;
   one or more ultra-wideband receivers configured to receive modulated interrogation ultra-wideband signals resulting from said initiated unique response codes directed from said awakened tags; and
   processing means coupled to each said ultra-wideband receiver for correlation, range determination, and for distinguishing said modulated interrogation ultra-wideband signals received from said awakened one or more tags.

2. The system of claim 1, wherein said one or more tags can be activated and detected at a range of up to about 20 meters.

3. The system of claim 1, wherein said one or more tags comprise a rectifying diode for powering purposes.

4. The system of claim 1, wherein a circuitry within in each said one or more tags is configured to switch an antenna to a reflective or a non-reflective state based on said unique response codes so as to produce said modulated ultra-wideband interrogation signals.

5. The system of claim 1, wherein said ultra-wideband high peak power pulses and said ultra-wideband pulsed formats comprise pulses of less than about 5 ns.

6. The system of claim 1, wherein said interrogation ultra-wideband pulsed formats comprise orthogonal codes.

7. The system of claim 1, wherein each respective said receiver is configured to detect a different frequency indicative of a predetermined tags said unique response code.

8. The system of claim 1, wherein said interrogating ultra-wideband pulsed formats is identical to said unique response code embedded in a predetermined tag.

9. The system of claim 1, wherein said interrogating ultra-wideband pulsed formats is different to said unique response code embedded in a predetermined tag.

* * * * *